(12) United States Patent
Morton et al.

(10) Patent No.: US 7,380,521 B2
(45) Date of Patent: Jun. 3, 2008

(54) COLLAPSIBLE PET CRATE

(75) Inventors: Julian Morton, 1097 Oakdale Rd., NE., Atlanta, GA (US) 30033; Michel Maurer, 79 Lilliput Road, Dorset (GB) BH1 48JX

(73) Assignees: Julian Morton, Atlanta, GA (US); Michel Maurer, Dorset (GB)

( * ) Notice: Subject to any disclaimer, the term of this patent is extended or adjusted under 35 U.S.C. 154(b) by 403 days.

(21) Appl. No.: 11/034,589

(22) Filed: Jan. 13, 2005

(65) Prior Publication Data

US 2006/0150917 A1 Jul. 13, 2006

(51) Int. Cl.
*A01K 1/03* (2006.01)
(52) U.S. Cl. ........................................... 119/499
(58) Field of Classification Search .............. 119/499, 119/474, 491, 492, 498, 504, 513, 514; 220/4.28, 220/4.29, 6
See application file for complete search history.

(56) References Cited

U.S. PATENT DOCUMENTS

| | | | | |
|---|---|---|---|---|
| 3,481,311 A | * | 12/1969 | Schluttig | 119/497 |
| 6,725,475 B1 | * | 4/2004 | Chen | 5/98.1 |
| 2004/0194723 A1 | * | 10/2004 | Farmer et al. | 119/474 |

* cited by examiner

*Primary Examiner*—Michael R. Mansen
*Assistant Examiner*—Monica L Williams
(74) *Attorney, Agent, or Firm*—Laurence P. Colton; Smith, Gambrell & Russell

(57) ABSTRACT

A collapsible cage/crate for pets having an inner framework within a soft-sided shell. The internal framework is integrated and manipulated by two locking hubs such that when the hubs are unlocked and urged towards each other, the crate collapses. In its deployed configuration, the crate provides an area for an animal to be confined whereas when the crate is collapsed the crate is compact and easy to transport. The outer shell of the crate is formed of fabric and includes one or more mesh panels in order to provide airflow into and out of the crate. Access is gained to the interior of the crate through one or more doors.

20 Claims, 9 Drawing Sheets

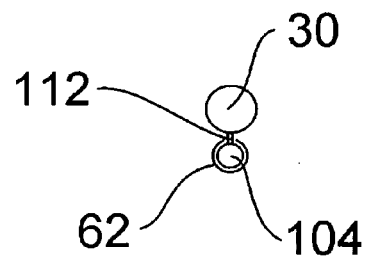
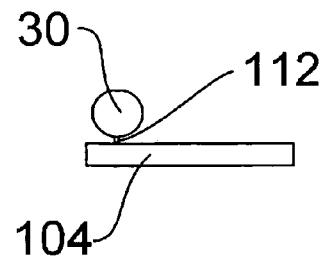
FIG. 7A  FIG. 7B
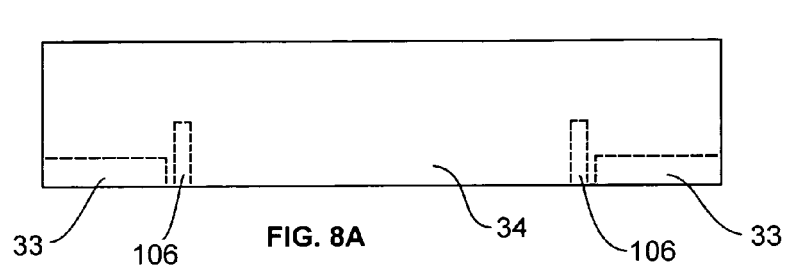
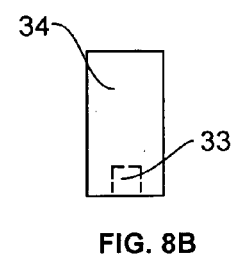
FIG. 8A  FIG. 8B
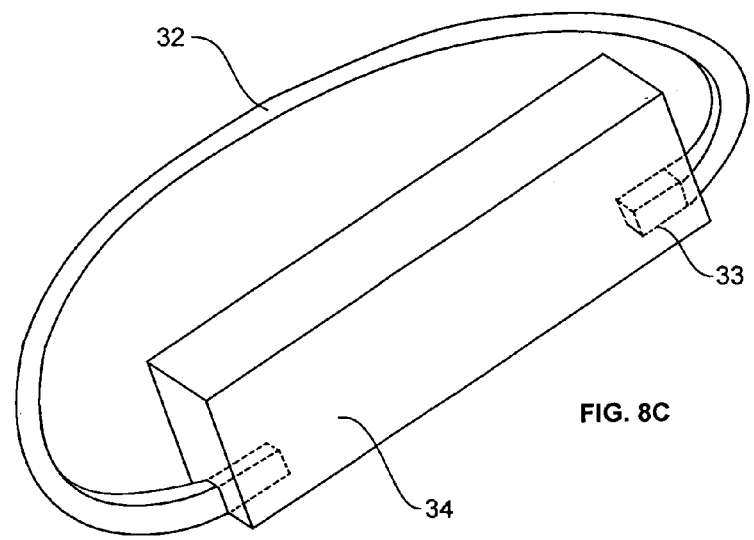
FIG. 8C

COLLAPSIBLE PET CRATE

BACKGROUND OF THE INVENTION

1. Technical Field

The present invention relates generally to cages/crates for dogs and other small animals, and more particularly to a pet crate that is collapsible and easily transportable, durable, easy to maintain, and inexpensive to manufacture.

2. Prior Art

The present invention relates primarily to collapsible/portable pet crates or cages that are lightweight, durable and compact. Many owners, trainers, breeders and veterinarians recommend dog crates as a convenient and humane tool for training puppies and to provide a safe environment for housebreaking, travel, and general control. Over time, the crate becomes the dog's den, which he regards as his home, rather than a cage that confines him. As such, portable crates are particularly useful for dogs at dog competitions such as agility, conformation and obedience trials due to their light weight and breathable nature and even more importantly because the dog can be put at ease due to his familiarity with the den, despite the significant stresses on the animal at such events.

Such portable crates are also utilized by families traveling with their pets so that the animals will have a familiar place to sleep. Not surprisingly, in such instances the more compact a crate is, the more likely it is to make it on the trip. Unfortunately, many crates are too large and cumbersome or they simply cannot be collapsed to a small enough size to travel. Further working against many prior art crates is that they are typically quite expensive to manufacture and assemble.

There is thus a need for an inexpensive collapsible crate that is easy to transport, yet durable enough to meet the needs of both human and animal.

BRIEF SUMMARY OF THE INVENTION

The present invention is directed towards providing an inexpensive, lightweight, collapsible pet crate that can be quickly deployed yet durable for transport and restraining animals. The invention includes a rigid internal framework and a soft-sided outer shell to present an aesthetically pleasing appearance while providing a sturdy den for small animals (the shell can be placed on the inside of the framing, but this is not the preferred orientation). The present invention is further beneficial in that it can be used (erected and deployed or taken down or collapsed, and transported) without the use of specialized tools or other equipment. Another benefit over many other crates is that a crate according to the present invention can be collapsed without removing any parts from the interior of the crate.

The crate has two main conditions: collapsed (taken down) and deployed (erected). In its deployed condition, the pet crate presents a typical rectangular soft-sided crate with rectangular floor, roof, walls and ends. In its collapsed condition, the crate is a bundle of much smaller height and width to yield a tremendous volumetric savings over traditional non-collapsible and even collapsible crates. For example, a typical medium sized crate with a width of 18 inches, height of 20 inches, and length of 26 inches consumes a volume of 9,360 cubic inches, but when collapsed according to the present invention, the volume can be reduced by 90 percent or more to a size of less than 6 inches in width and height and with the same length of 26 inches for a total volume of 936 cubic inches. As the pet crate's collapsed dimensions are almost independent of the height or width of the crate, if a larger width or height is used, the volumetric gains could be even higher. Such benefits make the pet crate extremely easy to store and transport, yet afford a full sized crate when deployed.

The pet crate's internal framework includes hubs located at opposite ends (preferably the side ends) of the pet crate in order to deploy/collapse the crate. When looking at an end of the crate's internal framework, masts form an "X" shape with four masts pivotally extending from each hub, one to each of the four corners on that end of the pet crate (at the center of the X is the hub.). At the corners of the crate, each mast is pivotally connected to a beam that runs along the top or bottom of the respective side of the crate to pivotably connect to another mast on the crate's opposite end.

In order to collapse the crate, one simply need unlock the hubs and push the two hubs towards the center of the crate. Since the masts are pivotally connected to both the hub and a respective corner/beam, when the hubs are forced inward, the four crate corners at each end are forced toward each other. Finally, as the shell is attached (preferably releasably) to the internal framework, when the two hubs are moved toward each other, the mesh is drawn with it and the entire crate collapses.

It is preferred that at least one side and part of the roof are formed of a mesh grid to afford ventilation and allow the pet owner and the pet to see in and out of the pet crate, respectively. One or more of these doors/windows may be coverable in instances in which privacy or confinement is preferred. The pet crate also may be fitted with pockets or clips to hold various items including collars and leashes.

These features, and other features and advantages of the present invention, will become more apparent to those of ordinary skill in the relevant art when the following detailed description of the preferred embodiments is read in conjunction with the appended drawings in which like reference numerals represent like components throughout the several views.

BRIEF DESCRIPTION OF THE DRAWINGS

FIG. 7A is a front view of a lock mechanism portion of the present invention.

FIG. 7B is a side view of a lock mechanism portion of the present invention.

FIG. 8A is a front view of a handle portion of the present invention.

FIG. 8B is a side view of a handle portion of the present invention.

FIG. 8C is a perspective view of a handle portion of the present invention.

DETAILED DESCRIPTION OF THE PREFERRED EMBODIMENTS

Figure 1:
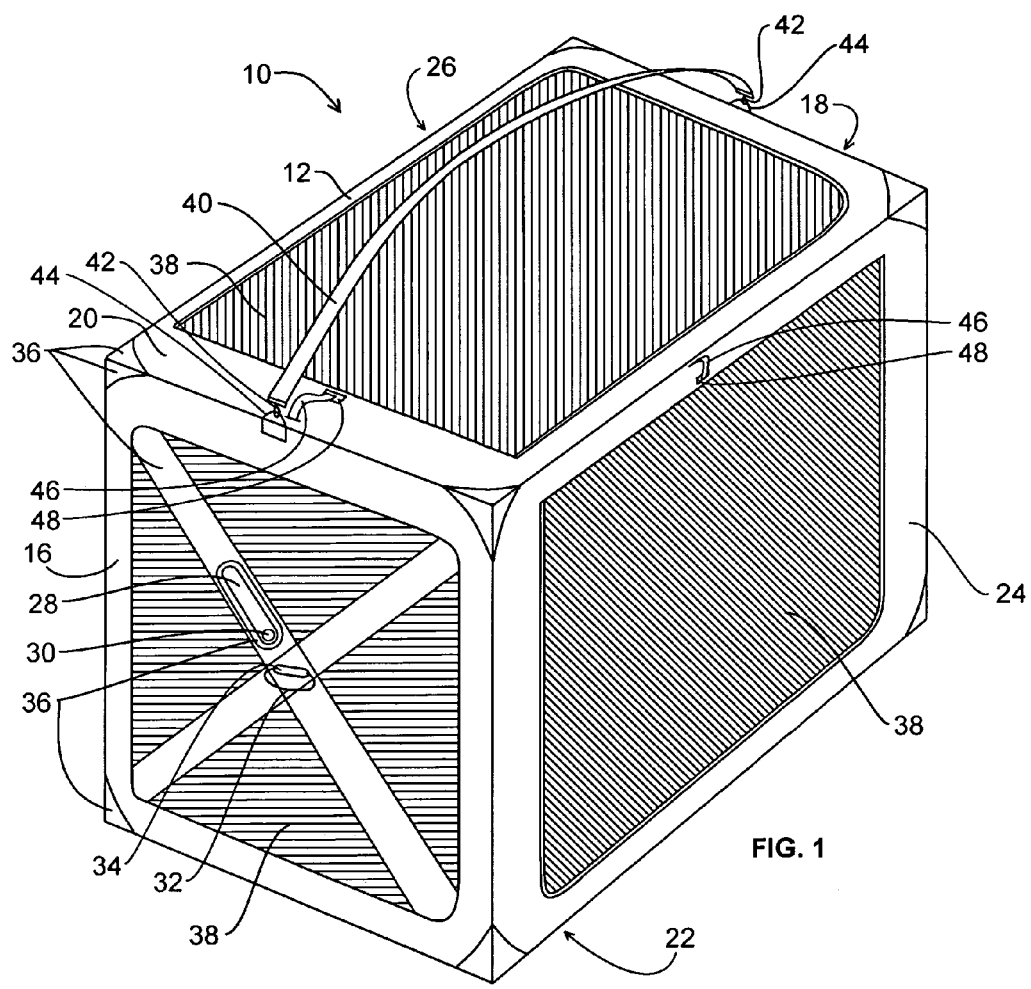
FIG. 1 is a perspective view of a collapsible pet crate according to an embodiment of the present invention in its deployed condition.
Figure 2:
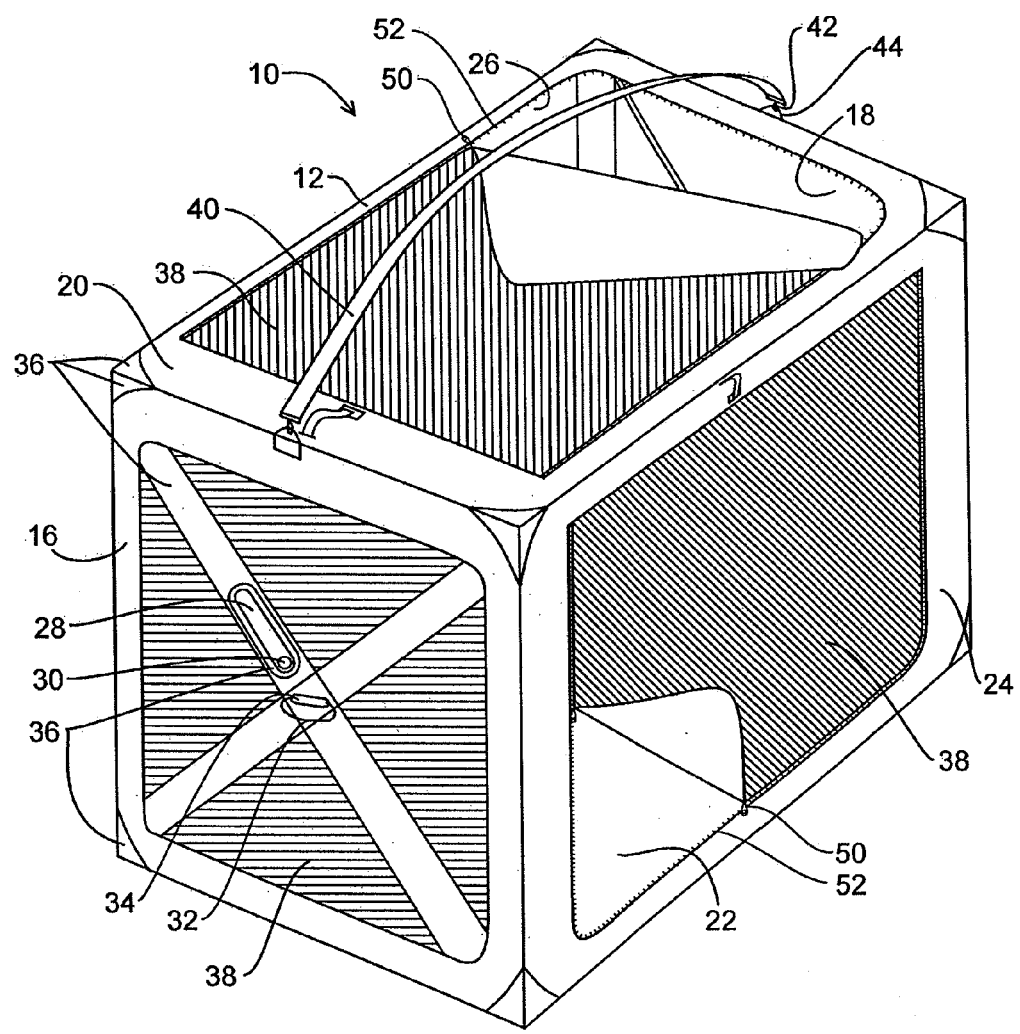
FIG. 2 is a perspective view of the embodiment of FIG. 1 showing the present invention wherein two doors/windows have been partially opened.
Figure 3:
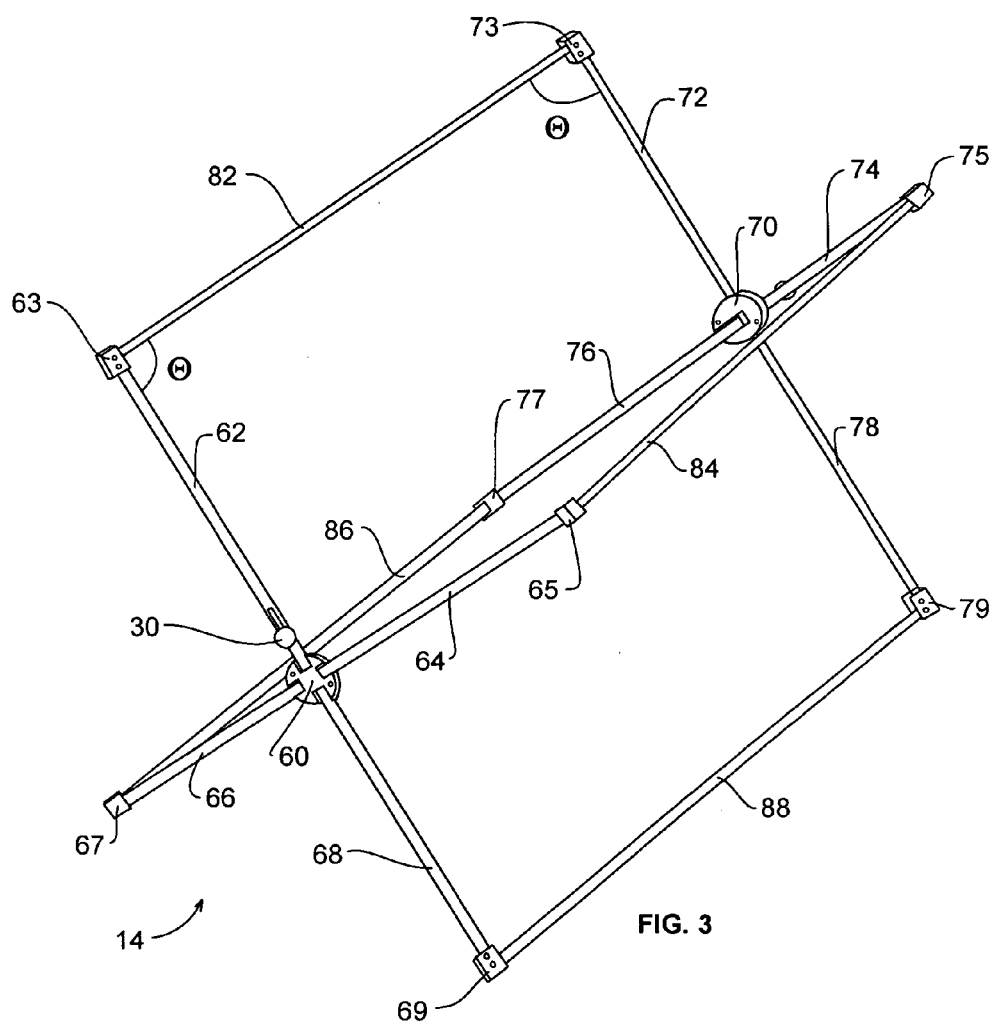
FIG. 3 is a perspective view of a portion of the present invention showing an internal framework.
Figure 4:
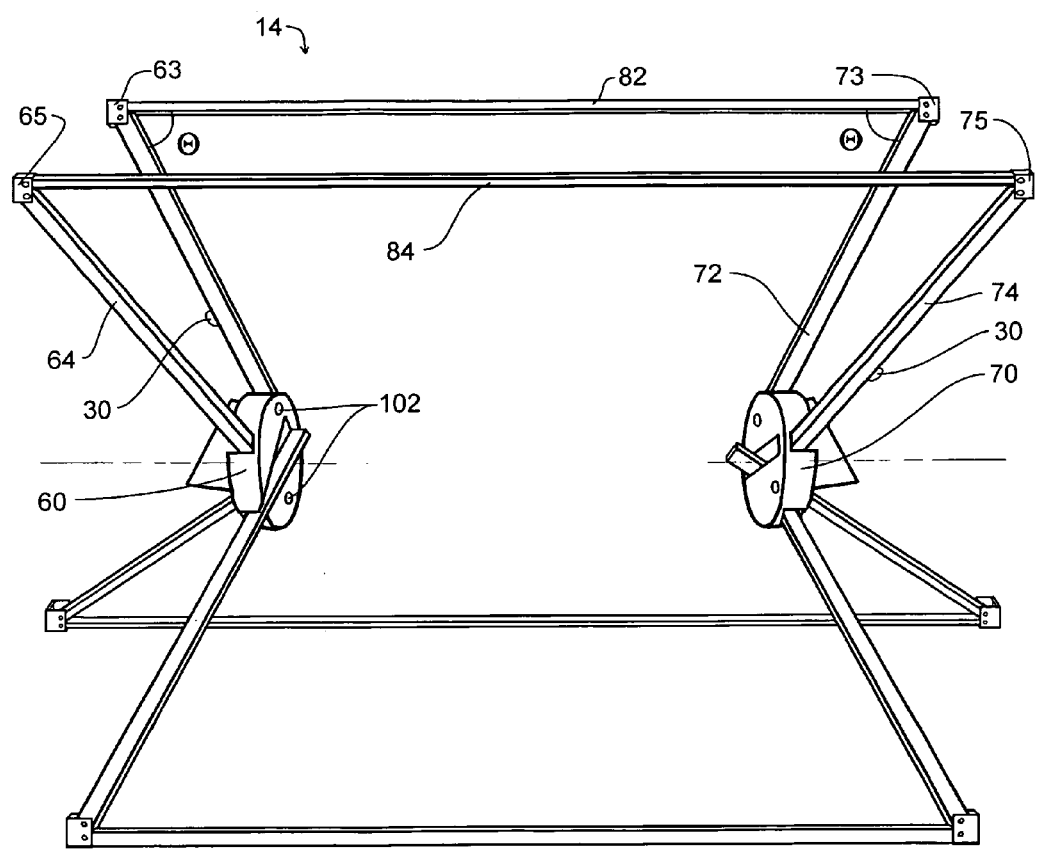
FIG. 4 is perspective view of a portion of the present invention showing an internal framework in a partially collapsed condition.

Referring now generally to FIGS. 1-9, preferred embodiments of the invention are shown. FIG. 1 is a perspective view of a pet crate 10 of the present invention in a deployed condition. FIG. 2 is a perspective view of pet crate 10 wherein two available doors have been partially opened to show the interior. FIG. 3 is a perspective view of an internal framework 14 of pet crate 10 in a deployed condition (i.e., without shell 12). FIG. 4 is a perspective view of internal framework 14 of pet crate 10 in a partially collapsed condition (i.e., without shell 12). FIG. 5A is a side view of internal framework 14 of pet crate 10 in a collapsed condition (i.e., without shell 12). FIG. 5B is a side view of a collapsed of pet crate 10 showing shell 12 and also showing internal framework 14.

Figure 6A:
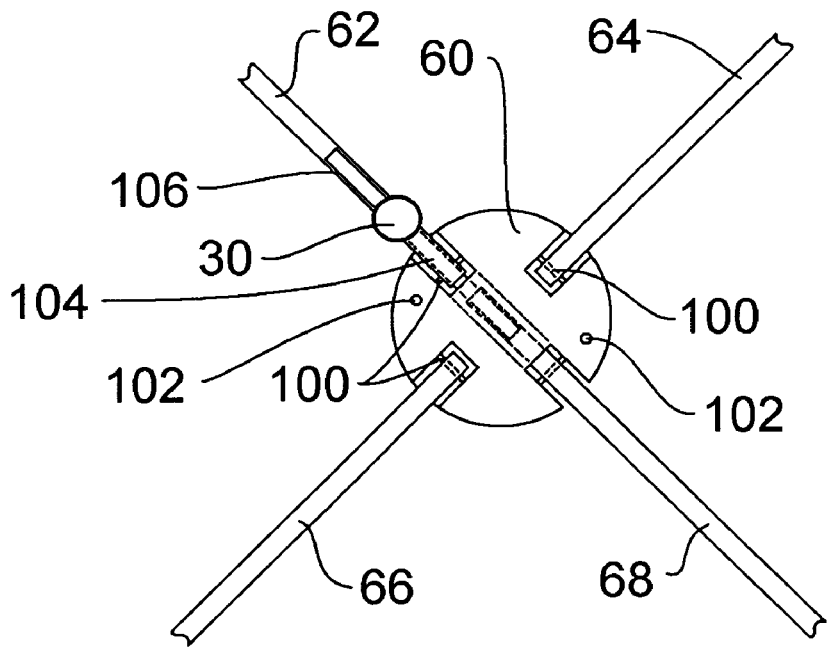
FIG. 6A is a front exterior view of a portion of an internal framework of the present invention in a locked condition.
Figure 6B:
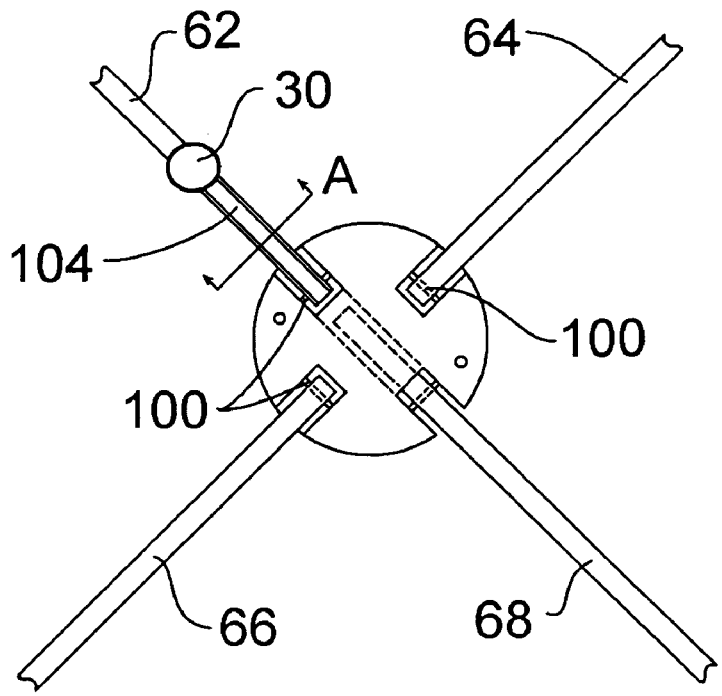
FIG. 6B is a front exterior view of a portion of an internal framework of the present invention in an unlocked condition.
Figure 6C:
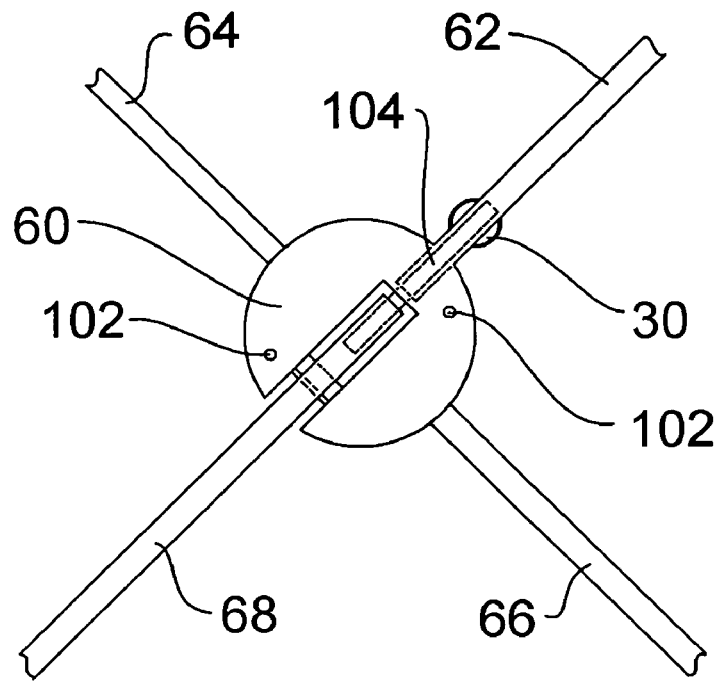
FIG. 6C is a front interior view of a portion of an internal framework of the present invention in a locked condition.
Figure 6D:
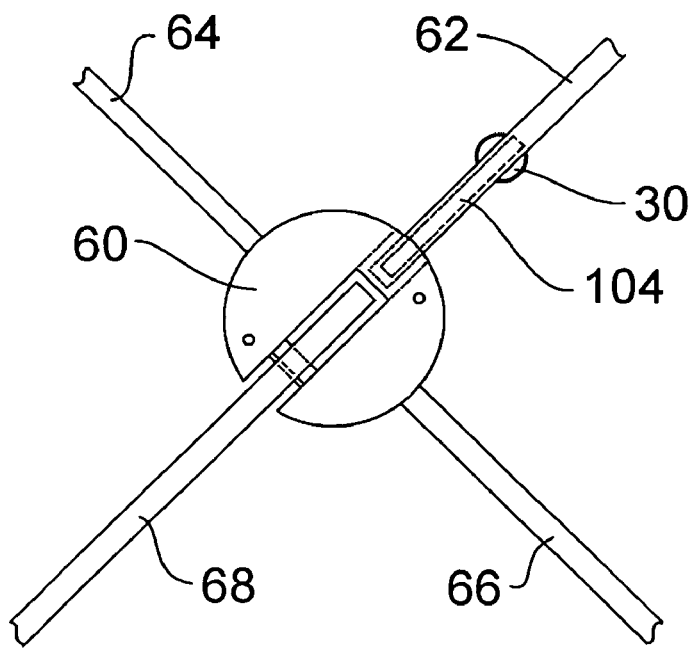
FIG. 6D is a front interior view of a portion of an internal framework of the present invention in an unlocked condition.

FIG. 6A is a partial front view of a portion of an exterior view of internal framework 14 showing hub 60 and a set of masts 62, 64, 66, 68 extending therefrom in which hub 60 is in a locked position so that pet crate 10 does not collapse unintentionally. FIG. 6B shows the configuration of FIG. 6A, except that pet crate 10 is now unlocked such that pet crate 10 may be collapsed. FIG. 6C is a partial front view of a portion of an interior view of internal framework 14 showing hub 60 and a set of masts 62, 64, 66, 68 extending therefrom in which hub 60 is in a locked position so that pet crate 10 does not collapse unintentionally. FIG. 6D shows the configuration of FIG. 6C, except that pet crate 10 is now unlocked such that pet crate 10 can be collapsed.

Figure 9:
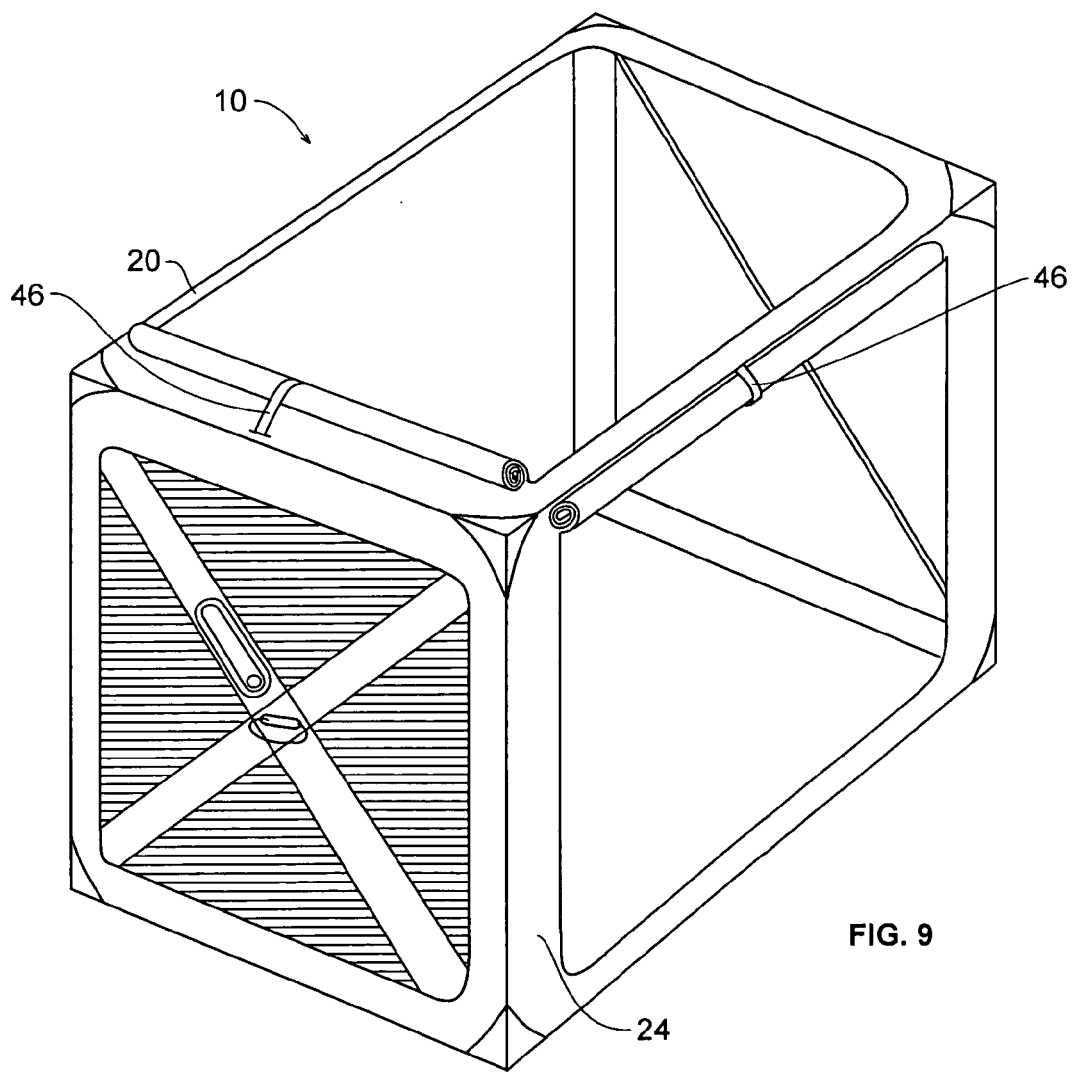
FIG. 9 is a perspective view of the present invention wherein two doors have been fully opened.

FIG. 7A is a partial sectional view along section line A of FIG. 6B showing the relationship between knob 30 and mast 62. FIG. 7B is a partial side view of what is shown in FIG. 7A. FIG. 8A is a frontal view of a handle portion of pet crate 10. FIG. 8B is a side view of the handle portion shown in FIG. 8A. FIG. 8C is a perspective view of the handle portion shown in FIGS. 8A and 8B. FIG. 9 is a perspective view of pet crate 10 showing several doors held open by straps to show the interior of pet crate 10.

FIG. 1 generally shows pet crate 10 in a parallelepiped configuration, it being understood that other cross-sectional configurations, such as triangularly shaped ends, may be used in the practice of the invention, if desired. Pet crate 10 is generally comprised of shell 12 and an internal framework 14 (shown in detail in following FIGS. 3-5). Though illustrated with an outer shell and an internal framework, it is equally within the scope of the invention to have an external framework with an internal shell wherein the pet crate would still function in the same manner and with similar benefits, though it is preferred to have the shell on the exterior to provide a more aesthetically pleasing appearance.

In more detail, pet crate 10 shell 12 includes first end 16, second end 18, roof 20, bottom 22, first side 24, and second side 26. Shell 12 should be comprised of a strong but flexible material, such as 1200 denier polyester polyvinyl chloride (PVC) coated as a waterproof fabric of the type commonly used in the construction of soft-sided luggage or waterproof tarpaulin materials, though it is to be understood that other materials may be utilized in the construction of pet crate 10, depending on the requirements of particular applications of the invention. Shell 12 also preferably includes one or more mesh portions 38 with grid holes to allow for ventilation and to allow pet owners and pets visual access into and out of pet crate 10. Shell 12 also may include reinforced sections or pads 36 at potential wear spots (such as the corners) to help pet crate 10 be more durable while not adding substantial weight.

Access may be gained to the interior of pet crate 10 by way of one or more windows/doors. Shown in FIG. 1 is a sunroof in roof 20 and a door in first side 24, though any number of doors/windows/access ports may be situated in various configurations on various sides (FIG. 9 in particular shows these doors fully opened). The sunroof in roof 20 is particularly advantageous for small animals in that the owner can lift the animal out of and place the animal into pet crate 10 and can have access to the animal in order to provide treats or water while the animal is still confined on all four sides by pet crate 10. The door in first side 24 is useful for heavier animals in that the owner does not need to lift the animal to place it into pet crate 10. The owner may keep the doors open by way of one or more roll-up door holders or straps 46. The straps should be affixed to shell 12 at one end, while the free ends have Velcro® hook and loop fastener pads or other attachment means attached thereto. It is preferred that there be two corresponding pads for each strap 46, the one visible in FIGS. 1 and 2, pads 48, and additional pads on the inside of the respective doors so that the straps can be used to hold the doors in an open position as shown in FIG. 9. Though straps 46 are shown as being sewn to shell 12, they may be affixed in any number of methods including gluing, snaps, fasteners, etc. Likewise, it is not necessary for Velcro® to be the attachment means and such securing may take place by snaps, ties, etc.

For ease in transporting pet crate 10, it is preferred that it include one or more carrying straps 40 which may be affixed to pet crate 10 by sewing, gluing, snaps, or other means, including the one shown which is by D-rings 44. In such case, carrying strap 40 should include some type of attachable buckle or snap that can be removably attached to D-ring 44 such as via snap 42. Straps 46 may also be used to hold/restrain handle 40 or other accessories such as dog leashes and collars.

Also shown in FIG. 1 is handle 32 that may be affixed to internal framework 14 by way of handle brackets 34 (a similar handle/bracket combination would be found on the opposite end of pet crate 10). Handles 32 are generally useful for manipulating pet crate 10 and, in particular, collapsing and expanding pet crate 10 in that they provide convenient grab points for the person to hold pet crate 10 while unlocking/locking pet crate 10. Further, handle brackets 34 are positioned such that shell 12 is trapped between brackets 34 and internal framework 14, providing a convenient method of keeping shell 12 in close contact with internal framework 14 to prevent flapping when pet crate 12 is deployed, and to keep shell 12 in contact with internal framework 14 when pet crate 10 is collapsed. Though these two points of securing shell 12 to internal framework 14 (i.e., at both ends) are sufficient for most purposes, it may be necessary to add further attachment points depending on the particular installation of the invention, such as at the corners of pet crate 10. For example, anchor straps (not shown) can be attached to shell 12 for wrapping around framework 14 or otherwise securing shell 12 to framework 14. Similarly, clips (not shown) can clip shell 12 to framework 14. More permanent but less preferable attachment means can include riveting, gluing, or sewing shell 12 to framework 14.

A further feature partially visible in FIG. 1 relates to a preferred mechanism of locking pet crate 10 so that it does not collapse prematurely. Shown in this figure is a hole 28 in shell 12 for knob 30 that allows a person to lock or unlock pet crate 10. This feature is further discussed below, particularly with regard to FIGS. 6-7.

As illustrated in FIG. 2, doors/windows in roof 20, and side(s) 24, 26 may be provided with zippers 50 which run on tracks 52 (though zippers are preferred, any acceptable means of securing the doors will suffice such as Velcro®, snaps, etc.).

FIG. 3 illustrates a preferred internal framework 14 component of pet crate 10. As pet crate 10 is collapsible, it has at least two positions: (1) expanded/deployed as shown in FIGS. 1 and 2, and (2) collapsed as shown in FIG. 5B. In order to transition between these positions, pet crate 10 preferably includes an internal framework 14 with a first hub 60 having several masts 62, 64, 66, 68 pivotably extending therefrom (hub 60 and masts 62, 64, 66, 68 are shown in more detail in FIGS. 6A-6D). At the opposite end of pet crate 10 is a second hub 70 that is pivotably attached to an equal number of masts 72, 74, 76, 78. Connecting these two sets of masts are a number of beams 82, 84, 86, 88. As shown in FIGS. 3, 4, and 6, when one views one of the hubs 60, 70 from the end of pet crate 10, an approximate "X" shape is formed between the various masts in a configuration with four masts per hub.

It should be noted that although the figures are shown with four masts per hub, the number of masts at each hub can vary as long as there are at least three masts per hub. In accordance with the invention, the number of masts at each hub should be the same, and an identical number of beams should be utilized to connect the masts from one hub to corresponding masts from the other hub.

As shown in FIGS. 3 and 4, each respective mast is preferably pivotably connected to a beam by way of a respective elbow, thus mast 62 is pivotably connected to elbow 63, which is then pivotably connected to respective beam 82. Continuing, mast 64 is pivotably connected to elbow 65, which is then pivotably connected to a respective beam 84, and so on, with masts 66, 68, 72, 74, 76, 78 being pivotably connected to elbows 67, 69, 73, 75, 77, 79, respectively, which then are pivotably connected to beams 86, 88, 82, 84, 86, 88, respectively. Although it is preferred to use an elbow to pivotably connect the masts to their respective beams, it is also within the scope of the invention to pivotably connect the masts to their respective beams without use of elbows.

In order to secure pet crate 10 in an open position, i.e., wherein angle θ is approximately 90° such that pet crate 10 presents a generally parallelepiped configuration, it is preferable that a locking mechanism be utilized, so that pet crate 10 does not collapse prematurely. Many suitable mechanisms can perform this task and a portion of a preferred mechanism using sliding pins is shown. FIGS. 1 and 2 show knob 30 protruding through slot 28 in shell 12 and FIGS. 3 and 4 show the relationship between knob 30 and internal framework 14. Knob 30 is attached to a pin 104 as shown in detail in FIGS. 6A-6D and 7A and 7B. Pin 104 is at least partly situated inside mast 62 and is in contact with knob 30 by way of cutout 106 in mast 62.

Pin 104 preferably extends from the interior of mast 62 into at least a portion of mast 68, such that masts 62 and 68 are maintained along the same centerline. In order to unlock pet crate 10, knob 30 is simply slid along mast 62 until the pin becomes disengaged from mast 68. A similar knob/locking mechanism is preferably found on hub 70 for use with masts 72, 78 or masts 74, 76. Though a sliding pin type lock is shown, many suitable mechanism would suffice such as springs located at the hubs (or even elbows) urging the masts into an orthogonal relationship with the beams, etc. In order to collapse pet crate 10, after masts 62, 68 and masts 72, 78 are unlocked, hubs 60, 70 are urged toward each other (i.e., angle Θ becomes reduced) as the crate is collapsed. FIG. 4 shows internal framework 14 in a partially collapsed condition in which angle Θ is less than 90°.

Figure 5A:
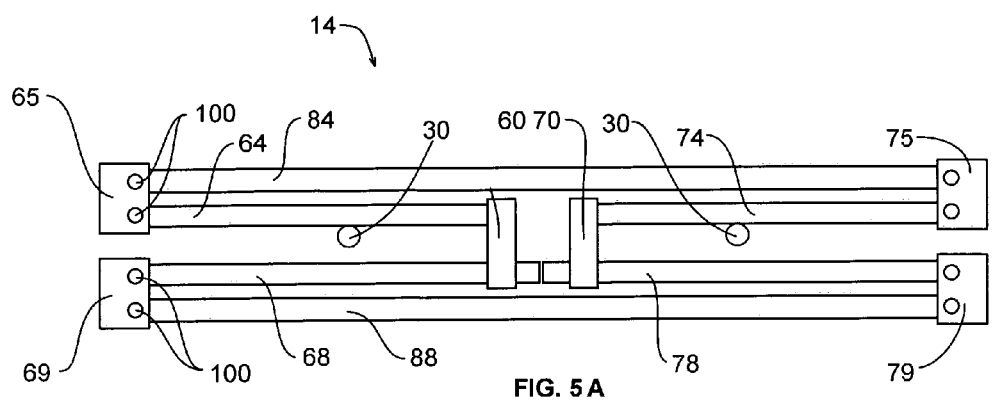
FIG. 5A is a side view of a portion of the present invention showing an internal framework in a fully collapsed condition.
Figure 5B:
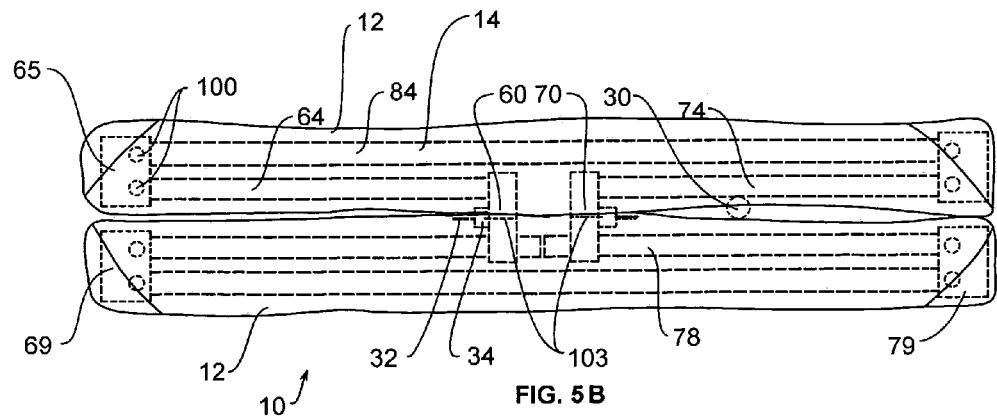
FIG. 5B is a side view of a portion of the present invention showing the internal framework and shell in a fully collapsed condition.

FIGS. 5A and 5B show internal framework 14 in a fully collapsed condition in which angle θ is approximately 0°. FIG. 5B shows internal framework 14 as a dotted line to show the relationship between the internal framework 14 and shell 12 when pet crate 10 is in a fully collapsed condition. FIG. 5B also shows the positioning of handle 32 and handle bracket 34 when pet crate 10 is collapsed. As can be seen, in the fully collapsed position, masts 62, 64, 66, 68, 72, 74, 76, 78 and beams 82, 84, 86, 88 are roughly parallel to each other, greatly reducing the volume of pet crate 10 relative to the deployed configuration. In the collapsed position, elbows 63, 65, 67, 69, 73, 75, 77, 79 remain at the outside corners of pet crate 10, while hubs 60, 70 are now centrally located within the collapsed pet crate 10.

FIGS. 6A-6D show partial front views of hub 60 and portions of masts 62, 64, 66, 68. FIG. 6A illustrates pet crate 10 in a "locked" condition such that knob 30 is slid toward hub 60 and pin 104 extends at least partly into mast 68. FIG. 6B shows a the same area of pet crate 10 as FIG. 6A, but in an "unlocked" position wherein knob 30 has been slid away from hub 60 such that pin 104 has become disengaged with mast 68 such that all of the masts attached to hub 60 are now free to pivot. Note that although only one mast is shown as being locked, it is of course possible to lock each mast individually with respect to hub 60, but this is a much more complex and costly method of preventing the collapse of pet crate 10, and therefore less desired. Also, although pin 104 is illustrated as being straight and the masts are directly in line allowing pin 104 to penetrate a second mast, pet crate 10 may be constructed with an odd number of masts wherein a flexible pin or linkage could be utilized in the same manner to still prevent the crate from collapsing.

Also shown in FIGS. 6A-6D screw holes 102 may be present in hub 60, 70 to permit screws 103 (not shown) to attach handle brackets 34, and handles 32 to hub 60/70 (trapping shell 12 between handle brackets 34 and hubs 60/70). Pins 100 in hub 60 permit masts 62, 64, 66, 68 to pivot (likewise for the masts attached to hub 70).

FIGS. 6C and 6D show an internal view of the subject matter of FIGS. 6A and 6B, that is, from the opposite side of hubs 60, 70.

FIG. 7A shows a partial section view along section A from FIG. 6B of the locking mechanism and FIG. 7B shows a side view of the mechanism wherein tab 112 connects knob 30 to pin 104. In this illustrative embodiment, mast 62 is a hollow cylinder and pin 104 is a solid rod. Knob 30 attached to pin 104 via tab 112, which extends through a slot in the side of mast 62. For example, with one respective pair of masts 62, 68 (or masts 72, 78) on a respective hub 60 (or hub 70) locked, the respective hub 60 (or hub 70) cannot move and therefore the remaining respective pair of masts 64, 66 (or masts 74, 76) will not pivot relative to the respective hub 60 (or hub 70).

As can be seen, in the four-mast configuration, it is only necessary to lock two opposing sets of masts, that is either masts 62, 68 or masts 64, 66 and masts 72, 78 or masts 74, 76, together to provide the structural rigidity necessary to maintain pet crate 10 in the deployed configuration. Further, as shown in the illustrative embodiment in FIGS. 6A-D, the outer diameter of pin 104 is less than the inner diameter of hollow mast 62 such that pin 104 can slide within the interior of hollow mast 62. The slot through the side of mast 62 is long enough to allow tab 112 to slide from the locked position (see FIGS. 6A and 6C) to the unlocked position (see FIGS. 6B and 6C) and back.

FIGS. 8A-C shows a partial front view of a preferred handle assembly including shafts 106 to receive screws 103 (not shown) and cutaways 33 to receive the end portions of handle 32. Though using screws 103 to attach handle bracket 34 to hubs 60/70 is preferred, any suitable method may be adopted including gluing, snaps, clamps, etc.

FIG. 9 shows pet crate 10 wherein two doors, one in roof 20 and another in side 24, have been fully opened and are held open by straps 46. Any number of roof 20, bottom 22, and sides 24, 26 can have opening doors, or none at all. Although ends 16, 18 can have opening doors or windows, it is preferred that they do not to minimize the possibility of interference with the locking and folding mechanisms.

The preferred assembly order is to (1) assemble internal framework 14, (2) insert internal framework 14 into shell 12, (3) insert screws from inside of shell 12 through hubs 60, 70 so that screws go through the hubs, through shell 12 and are anchored in handle bracket 34. Further, anchors (not shown) attached to shell 12 can anchor shell 12 to framework 14. Though internal framework 14 may be made of many materials, including wood, metal and plastics, it is preferred that the masts and beams be made of aluminum as a light, yet durable material in order to provide many years of service.

Although the above description was more tailored to a configuration including an internal framework 14 and an external shell 12, it is within the present invention to have an internal share attached to an exoskeleton. In such a configuration, the shell 12 is preferably attached to the framework 14 by Velcro® straps or other means at the corners of the pet crate 10 and at the hubs 60, 70. It is, however, preferred to have an outer shell 12 with an inner framework 14 such that no hard edges or surfaces are on the exterior to scratch or damage car interiors when transporting pet crate 10 in either its deployed or collapsed condition (it would add considerable expense to coat the framework such that no hard surfaces were present if an exoskeleton were used). In either case, neither the framework 14 nor the shell 12 need be removed in order to collapse/transport/deploy pet crate 10.

The foregoing detailed description of the preferred embodiments and the appended figures have been presented only for illustrative and descriptive purposes. They are not intended to be exhaustive and are not intended to limit the scope and spirit of the invention. The embodiments were selected and described to best explain the principles of the invention and its practical applications. One skilled in the art will recognize that many variations can be made to the invention disclosed in this specification without departing from the scope and spirit of the invention.

What is claimed is:

1. A collapsible pet crate comprising:
    a) an internal framework having:
        a first hub having a first central axis;
        a second hub having a second central axis;
        a first set of at least three masts each having a respective first mast end pivotally attached to the first hub and a second mast end, wherein each mast in the first set of masts pivots in a separate mast plane parallel to the first central axis;
        a number of beams corresponding to the number of masts in the first set of masts, wherein a first beam end of each beam is pivotally connected to the second mast end of a mast from the first set of masts and the beams are substantially parallel to the first central axis;
        a second set of at least three masts each having a respective first mast end pivotally attached to the second hub and a second mast end attached to a respective beam, wherein each mast in the second set of masts pivots in a separate mast plane parallel to the second central axis and the number of masts that are in the first set of masts; and
    b) an external shell that covers a substantial portion of the internal framework wherein the crate has at least two positions, a first position in which the crate is deployed and the first set of masts are in a common plane substantially orthogonal to the first central axis and to the beams and the second set of masts are in a common plane substantially orthogonal to the second central axis and to the beams, and a second position in which the crate is collapsed and all of the masts are substantially parallel to each other and parallel and proximal to the beams.

2. The device as claimed in claim 1, further including a locking means to keep the crate in the first position.

3. The device as claimed in claim 2, wherein the locking means comprises a pin that maintain two of the masts in the first set of masts in a locked relationship relative to each other and to the first hub such that the two masts in the locked relationship are in a plane substantially orthogonal to the first central axis.

4. The device as claimed in claim 3, wherein at least one of the two masts in the locked relationship is prevented from pivoting relative to the first hub by the locking means.

5. The device as claimed in claim 4, wherein two masts in the locked relationship have at least partially hollow interiors and the pin is slidable within the hollow interior of a first of the two masts and into the hollow interior of a second of the two masts.

6. The device as claimed in claim 1, wherein the hubs are coaxial.

7. The device as claimed in claim 1, wherein the beams are at least twice as long as each mast.

8. The device as claimed in claim 1, wherein the masts and hubs are situated between the beams when the crate is in the second position.

9. The device as claimed in claim 1, wherein the first hub and the second hub are at opposite ends of the crate.

10. The device as claimed in claim 1, wherein the shell covers at least one hub.

11. The device as claimed in claim 1, wherein there are only two hubs, the hubs are coaxial, and the first central axis and the second central axis are coaxial.

12. The device as claimed in claim 1, wherein at least a portion of the shell comprises a mesh.

13. The device as claimed in claim 1, wherein the shell comprises at least one door for allowing access to the interior of the crate.

14. The device as claimed in claim 13, further comprising at least one door strap to keep the at least one door in an open position.

15. The device as claimed in claim 2 wherein the locking means is actuatable from outside the crate.

16. The device as claimed in claim 1 wherein when the crate is in the second position, the crate comprises a package wherein the masts and beams are pivoted to lie adjacent to other lengthwise forming a package of outer cross-section defined by the hubs plus a width of at least two of the beams and a length defined by a length of the beam.

17. The device of claim 1, wherein the crate is collapsible without removing the internal framework.

18. A collapsible pet crate comprising:
   a) an internal framework having:
      a first hub having a first central axis;
      a second hub having a second central axis;
      a first set of four masts each having a respective first mast end pivotally attached to the first hub and a second mast end, wherein each mast in the first set of masts pivots in a separate mast plane parallel to the first central axis;
      a number of beams corresponding to the number of masts in the first set of masts, wherein a first beam end of each beam is pivotally connected to the second mast end of a mast from the first set of masts and the beams are substantially parallel to the first central axis;
      a second set of four masts each having a respective first mast end pivotally attached to the second hub and a second mast end attached to a respective beam, wherein each mast in the second set of masts pivots in a separate mast plane parallel to the second central axis and the number of masts that are in the first set of masts; and
   b) an external shell that covers a substantial portion of the internal framework; and
   c) a locking means to keep the crate in the first position, the locking means comprising a pin that maintains two of the masts in the first set of masts in a locked relationship relative to each other and to the first hub such that the two masts in the locked relationship are in a plane substantially orthogonal to the first central axis and at least one of the two masts in the locked relationship is prevented from pivoting relative to the first hub by the locking means wherein the crate has at least two positions, a first position in which the crate is deployed and the first set of masts are in a common plane substantially orthogonal to the first central axis and to the beams and an approximate X shape is formed between the first set of masts and the first hub and the second set of masts are in a common plane substantially orthogonal to the second central axis and to the beams and an approximate X shape is formed between the second set of masts and the second hub, and a second position in which the crate is collapsed and all of the masts are substantially parallel to each other and parallel and proximal to the beams.

19. The device as claimed in claim 18, wherein there are only two hubs, the hubs are coaxial and are located at opposite ends of the crate and the first central axis and the second central axis are coaxial.

20. The device as claimed in claim 19, wherein the shell comprises at least one door for allowing access to the interior of the crate.

\* \* \* \* \*